United States Patent [19]

Wooldridge

[11] Patent Number: 4,469,077
[45] Date of Patent: Sep. 4, 1984

[54] FUEL MIXTURE METHOD AND APPARATUS FOR INTERNAL COMBUSTION ENGINES

[76] Inventor: Bobby M. Wooldridge, P.O. Box 337, Buena Vista, Ga. 31803

[21] Appl. No.: 381,436

[22] Filed: May 24, 1982

[51] Int. Cl.³ .......................................... F02M 31/00
[52] U.S. Cl. .................................. 123/548; 123/545; 123/590; 261/144; 261/145
[58] Field of Search ............... 123/548, 590, 593, 545, 123/547; 261/144, 145, DIG. 21, DIG. 55

[56] References Cited

U.S. PATENT DOCUMENTS

| | | | |
|---|---|---|---|
| 1,016,741 | 2/1912 | Fritz | 123/545 |
| 2,588,474 | 3/1952 | Bellios | 123/590 |
| 3,338,568 | 8/1967 | Mangoletsi | 261/145 |
| 3,640,256 | 2/1972 | Low | 261/145 |
| 3,762,385 | 10/1973 | Hollnagel | 123/545 |
| 4,020,811 | 5/1977 | LaForce | 123/548 |
| 4,044,741 | 8/1977 | Swingley | 123/545 |
| 4,233,948 | 11/1980 | Crumrine | 123/590 |

FOREIGN PATENT DOCUMENTS

| | | | |
|---|---|---|---|
| 554035 | 6/1923 | France | 261/145 |
| 925451 | 9/1947 | France | 123/545 |
| 760456 | 10/1956 | United Kingdom | 123/548 |
| 1377744 | 12/1974 | United Kingdom | 123/545 |

Primary Examiner—Ronald H. Lazarus
Attorney, Agent, or Firm—Patrick F. Henry

[57] ABSTRACT

A housing located between a conventional carburetor and the intake manifold inlet on a conventional internal combustion engine (such as that used in an automobile) has internal compartmentation to receive a volume of fuel and air mixture from the carburetor and to direct same through an outlet compartment and thence through a conduit to a fuel mixture heat exchanger mounted on the engine. The heat exchanger comprises one or more heat exchanger units each having a closed cylindrical housing with a plurality of closed, individual fuel mixture conduits therein (such as copper tubing). Each cylindrical housing is connected by a conduit, such as a hose, to the hot air exhaust manifold of the engine so that the heated air from the manifold is directed through each housing and around the heat exchanger tubes therein. A filter unit comprises a closed housing which receives the heated fuel through a porous screen baffle and a series of conventional ceramic or foam plastic or other types of filter material. The method comprises the procedure of directing the fuel mixture from the carburetor through the above system and apparatus and back into the engine.

8 Claims, 6 Drawing Figures

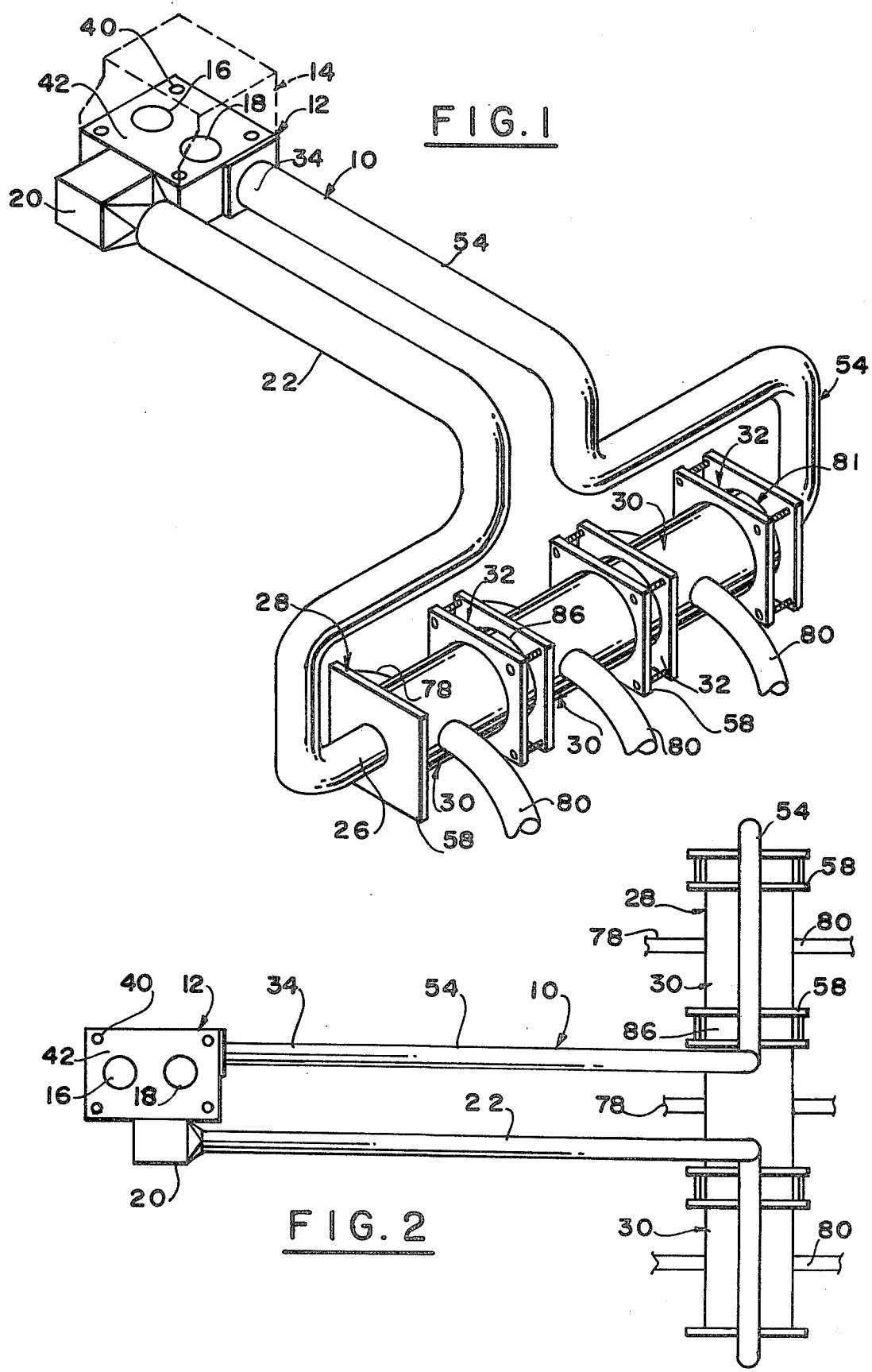

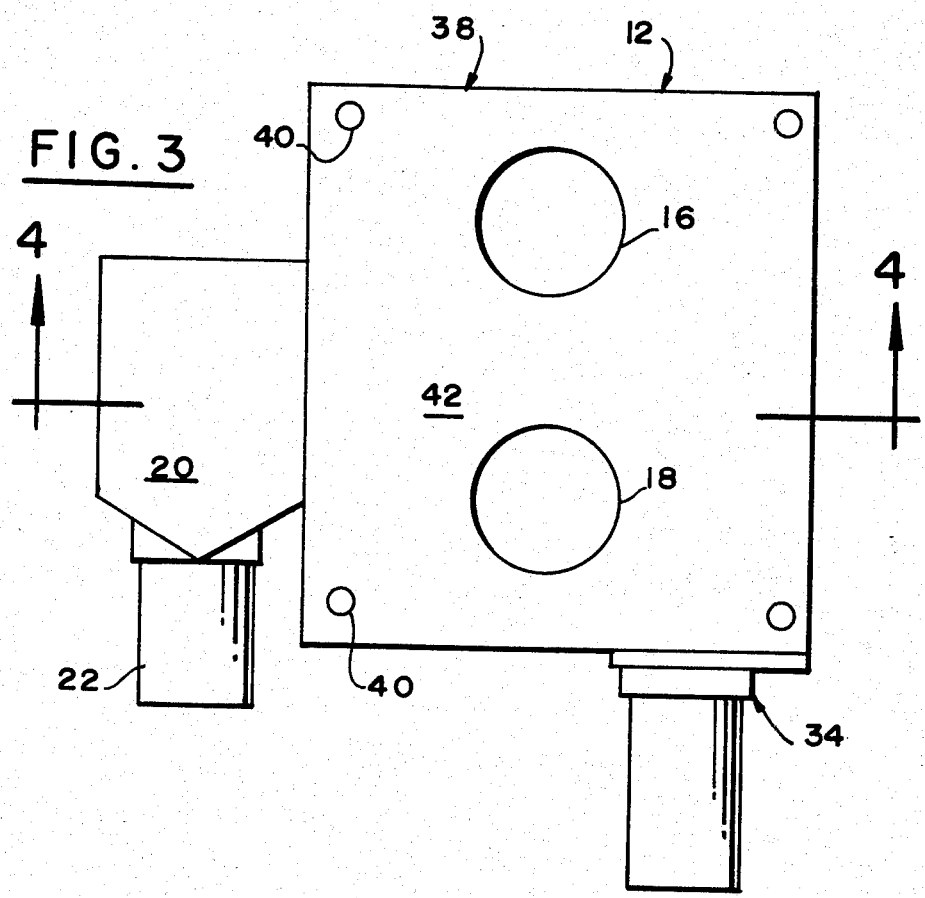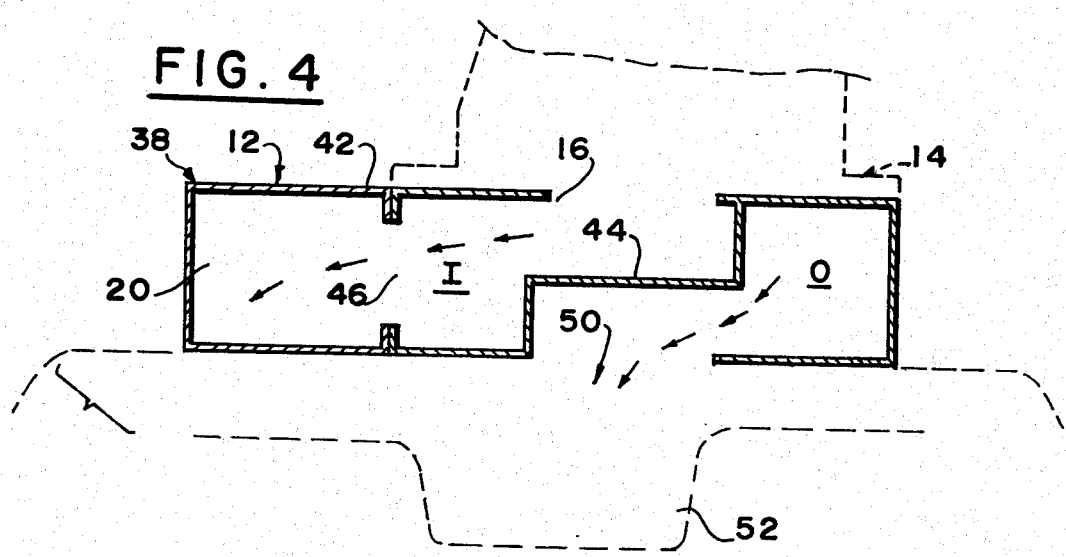

FUEL MIXTURE METHOD AND APPARATUS FOR INTERNAL COMBUSTION ENGINES

BACKGROUND OF THE INVENTION

1. Field of the Invention

The field of the invention is that of internal combustion engines and more particularly charged-forming devices employing a heating means to heat the fuel mixture by means of the heated air from the exhaust of the engine.

2. Prior Art

The prior art is replete with devices for attachment to or incorporation in the system of an internal combustion engine from the mixing of the fuel in the carburetor to the delivery of the fuel mixture into the combustion chamber. Such prior art includes heat exchangers and means for heating the air prior to introduction into the carburetor as well as heating the fuel mixture delivered from the carburetor prior to delivery into the combustion chamber. One major problem is the complexity and sensitivity inherent in such devices whereby the modification of the engine is complicated and the proper adjustment is critical so that it is necessary to devote constant attention to make sure that the necessary factors are correct such as the correct heat of the fuel mixture so as not to cause air and vapor locks in the system, and also not to cause premature explosion and such unwanted conditions known as dieseling.

The most common method used today is the carburetor which has proven to be quite reliable over the past years but is very inefficient. The carburetor injects liquid gasoline into the inlet air stream. Due to the velocity of the air gasoline mixture, only a small amount of the liquid has time to gas (gasoline in a liquid state will not burn), therefore only the small amount of fuel that gases is used to produce power. The excessive portion of the fuel aids in cooling valves, pistons etc., as it enters the cylinder, however, it has several disadvantages.

1. A portion of the liquid is forced downward, on compression stroke, past the compression ring; this fuel tends to wash away the lubricant from the cylinder walls, causing cylinder wall and piston ring wear.

2. The remainder of the unburnable substance begins to gas and burn after ignition takes place. Only the fuel that burns at time of ignition produces power; all additional fuel is waste. After ignition the temperature increases causing the remainder of the ungassed fuel to gas and continue to gas through the exhaust manifold.

The fuel air charge at the time of ignition burns at a rate of 100 ft. per second across the face of the piston. The pressure on top of the piston at T.D.C. of the compression stroke is approximately 1000 P.S.I. The pressure drops to about 60 P.S.I. at 120 degrees of crankshaft travel. The secondary burn (burn after ignition) has no bearing on the power stroke in relation to power. However, there is 360 degrees plus in relation to crankshaft travel of wasted fuel and additional heat. There has been many attempts in devising ways to burn all the fuel at the point of ignition, even after the gases leave the engine. Before this can be accomplished the fuel must be in a burnable condition. The only way to accomplish this is to physically break down the chemical make-up of the gasoline, mixing the proper amount of burnable gas with the proper amount of air and introducing it into the combustion chamber. This will eliminate 360 degrees of fire in the engine, in relation to crankshaft travel. With the present carburetor there is fire in the engine 360 degrees out of 720 degrees and that is over half the life of the engine. The present invention reduces the fire in the engine to 6 degrees. This saves the fuel it takes to produce the burn through the last 360 degrees plus the burn in the exhaust system, which reduces pollution.

3. Pollution is another disadvantage of the old method. With the old method several devices have been used with the carburetor to try to clean up the exhaust.

Another device is the air pump which is an engine driven pump that pumps air into the exhaust manifold to continue to burn the unburned gases. The air burns up before the gas. It takes from three to five horsepower to turn the pump depending upon the speed which requires more fuel for the engine, therefore causing more pollution. Thus the question whether the pump helps the pollution problem enough to compensate for the additional fuel it takes to run it. With the present invention this device would not be necessary.

The catalytic converter is another device used on automobiles today. This device magnifies the exhaust heat to an extremely high temperature to attempt to destroy or filter out pollutants in the exhaust. This high temperature has proven to be dangerous. For example, at a golf tournament in Augusta, Ga. an automobile equipped with a converter, parked on a grassy area, caused a fire that destroyed it and three other nearby cars, due to the fact that the catalytic device was so hot the heat started a fire on the grass underneath the car. Also, some service stations in the West will not allow cars equipped with the device to come near their pumps due to the dangerous high temperature.

The most logical way of cleaning up the exhaust is not to contaminate it in the first place. This invention increases thermal efficiency of the engine, this increased gas mileage. When this is accomplished, the exhaust pollution is decreased to a minimum, without the use of costly added gadgets.

Any less fuel, using a carburetor, injected into the engine other than a 15:1 ration would be a lean mixture. A lean mixture is hotter than a rich mixture, therefore heat damage would occur. Liquid gasoline gasses in proportion to volume. In other words, the larger the volume used the more gas is released by the same token, less volume used, the less gas is released.

This invention physically breaks down the chemical make-up of gasoline. Only a 100 percent burnable substance enters the combustion chamber. This is by no means a lean mixture. The oncoming gas from a carburetor aids in cooling the cylinder assembly. The gas from this invention is far lower in temperature than that of the carburetor, more than adequate to cool the cylinders, plus the fact that there is no after burn.

The present system is believed to be an acceptable modification of the engine which is easily installed by means of an adapter which also forms part of the fuel mixture intake housing and chamber and a heat exchanger, filtration system which is intended to improve performance without complex maintenance.

SUMMARY OF THE INVENTION

A system employing apparatus for receiving a volume of fuel mixture from a conventional carburetor, directing same through a heat exchanger which maintains the fuel mixture in a closed circuit while properly heating the mixture by means of the heated exhaust gases from the internal combustion engine, and then the mixture still maintained in a closed circuit is filtered, properly agitated and directed back into the fuel mixture intake of the internal combustion engine.

An object of this invention is to provide a simple and expedient way of modifying an engine, or incorporating such system into a new engine, for heating and cooling the fuel mixture sufficiently to improve combustion and to use the exhaust gases of the engine for this purpose.

Another object of this invention is found in the particular heat exchanger system whereby the fuel mixture is maintained in a closed circuit while it is subject to the gases from the vehicle exhaust system.

Another object of this invention resides in the housing of the present system which is three-dimensional and includes chambers for receiving the fuel mixture and directing same to the heat exchanger and filter apparatus.

SUMMARY OF OPERATION

Gasoline enters the carburetor in its normal manner from the fuel pump. The operation of the carburetor is the same as always. As air flow passes through the venturi of the carburetor at cruise or past the throttle valve at idle speeds, a pressure differential is created, causing fuel to be drawn out of the metering jets. This fuel air mixture passes through the carburetor and into the carburetor base plate, the mixture enters the base plate through the openings on top. The openings should be equal open area with a total open area equal to the total open area of both exit parts of the carburetor plus/minus 0. The formula used to find this figure is: Area=Square of Diameter×0.7854. The fuel air mixture leaves the carburetor base plate through the exit part of the base plate. The chamber inside the base plate and the exit part are polished so to cut down on friction loss and have an open area equal to but not to exceed the open area of the carburetor capacity. The same formula is used as above. The fuel air mixture is then routed from the base plate to the vaporizer unit by means of a connector tube. Again, this tube must have at least, but not exceed the carburetor capacity. This tube should be polished to reduce friction loss.

The fuel air mixture leaves this connector tube and enters the first stage heater assembly. The heater assembly is heated from engine exhaust from the exhaust manifold. The heaters must provide enough heat to gas all the chemical properties that are in gasoline.

The transfer tubes in the heaters should have a total combined open area equal to the maximum capacity of the carburetor, plus area for tubes it absorbs heat and starts to gas. When the mixture passes through the heater assembly it then enters the first stage cooler assembly, first striking the first cooling plate or screen. This screen or plate has 920 holes per square inch, 0.020 in. diameter base. (The total open area of this screen or plate is equal to the total open area of the carburetor plus/minus 0). The formula used to find this open area is: Area=Square of Diameter×0.7854. When the mixture passes through the first plate it goes through a foam rubber filter. The purpose of this filter is to keep the droplets from joining together. The mixture passes through the filter and through the back screen or plate, the screen is constructed identically to the first. As the mixture is forced or drawn through the cooler assembly, first plate, filter and second plate, the temperature drops. This temperature drop is caused by forcing the mixture through the small orifices or holes in the first and second screen. After the mixture passes through the first stage cooler assembly, it then goes through the second stage heater which is identical in construction and theory as the first. The mixture temperature is raised again to a gassing point as it passes through the transfer tubes, more gassing is completed, when the mixture leaves the second stage heater it passes through the second stage cooler. This cooler is identical in construction and theory as the first stage cooler. The mixture is recooled and further broken down as it passes through this cooler assembly, then through the third heater identical to the first and second stage, where the final gassing takes place, through the third stage heater then the third stage cooler assembly, which is identical in construction and theory as the first and second stage cooler. The temperature of the mixture is cool enough at this point to adequately aid in cooling the valves and cylinders. Not only does this series of heating and cooling gas the fuel completely, but also mixes the fuel and air completely, which is necessary for a good burn in the cylinders.

As the mixture leaves the third stage cooler assembly the mixture is then routed to the bottom chamber of the carburetor base plate by another connector tube. This tube is the vaporizer unit exit tube and the carburetor base plates entrance tube. This tube is identical in construction as the vaporizer entrance tube. The entrance opening of the base plate is equal to but not to exceed the total open area of the carburetor. The fuel air charge enters the bottom section of the base plate and exits to the intake through the exit parts. These openings are identical to the openings on the base of the carburetor. The mixture passes through the intake manifold and into the cylinders. The mixture is a 100% burnable mixture and throughly mixtured for a clean 100% burn.

Other and further objects and advantages of this invention will become apparent upon reading the following description of the preferred embodiment taken in conjunction with the accompanying drawings.

BRIEF DESCRIPTION OF THE DRAWINGS

FIG. 1 is a three-dimensional perspective view of the exterior of the present system showing a conventional carburetor in dotted lines.

FIG. 2 is a top plan view of the system shown in FIG. 1.

FIG. 3 is a top plan view of the fuel mixture housing of the present invention which may also serve as an adapter between the carburetor and the intake for the engine.

FIG. 4 is a cross-sectional view taken substantially along lines 4—4 in FIG. 3.

DESCRIPTION OF A PREFERRED EMBODIMENT

Figure 5:
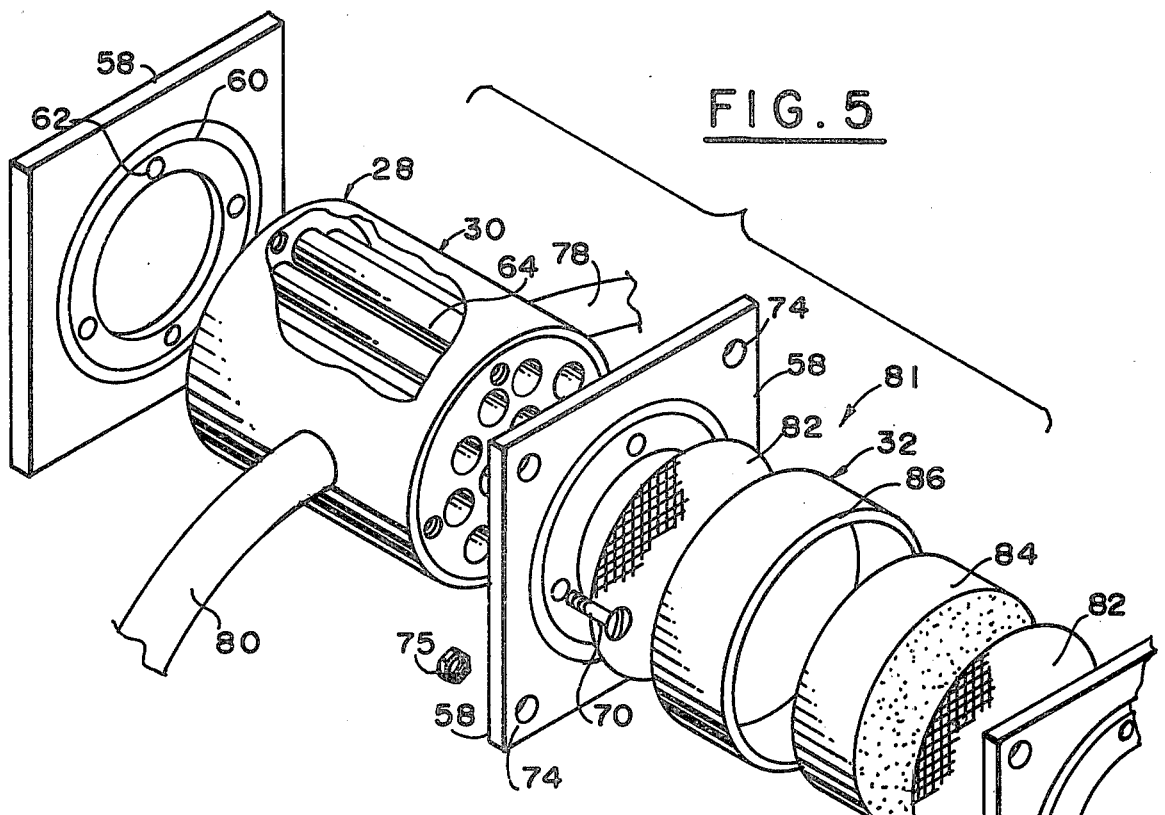
FIG. 5 is a disassembled perspective view showing one of the heat exchanger units and the final filter unit of the heat exchanger.

The entire system 10 in FIG. 1 comprises a fuel mixture housing 12 which is a three-dimensional unit designed for a particular vehicular engine to receive the conventional carburetor 14 and to mount same rigidly on the conventional fuel mixture inlet (not shown) which in most internal combustion engines is a three-dimensional flanged housing having threaded bolt holes therein. Housing 12 will be described in more detail hereinafter in connection with FIGS. 3 and 4 and it includes fuel mixture circular intake inlets 16, 18 leading internally to an outlet chamber 20 which has an outlet pipe or conduit 22 connected thereto to direct the fuel mixture from carburetor 14 in a closed circuit.

Conduit or pipe 22 leads through various angles and bends to fit over a particular engine (not shown) to the inlet 27 of a heat exchanger 28 comprising a series of heat exchanger units or heaters 30 connected and coupled together with filter units 32 in a series comprising one or more of such heat exchanger units or heaters 30 and filter or vaporizer units 32 for the purpose of heating the fuel mixture from conduit 22, agitating and filtering same and returning it to the inlet 34 of housing 12 from which it is directed into the fuel mixture inlet of the internal combustion engine.

As seen in FIGS. 3 and 4, the housing 12 is a three-dimensional structure of box-like construction having bolt holes 40 therein and a top plate 42 in which are the inlets 16 and 18. The interior of the housing 12 should be polished and is divided by a baffle 44 throughout the structure 38 so as to divide the structure into an inlet compartment I and an outlet compartment O. The inlet compartment has an opening 46 in the wall of compartment 20 so that the fuel mixture from a carburetor 14 is directed through the openings 16, 18 through the opening 46 and into conduit 22.

The heated fuel mixture which passes from the heat exchanger 28 through the inlet 34 passes into the chamber O and downwardly through an opening 50 which leads to the internal combustion engine fuel mixture intake 52 shown in dotted lines in FIG. 4. The heated fuel mixture is delivered from the heat exchanger through an outlet conduit 54 which may bend and turn in the manner shown in FIG. 1 ultimately leading to the inlet 34 in the housing 12.

Figure 6:
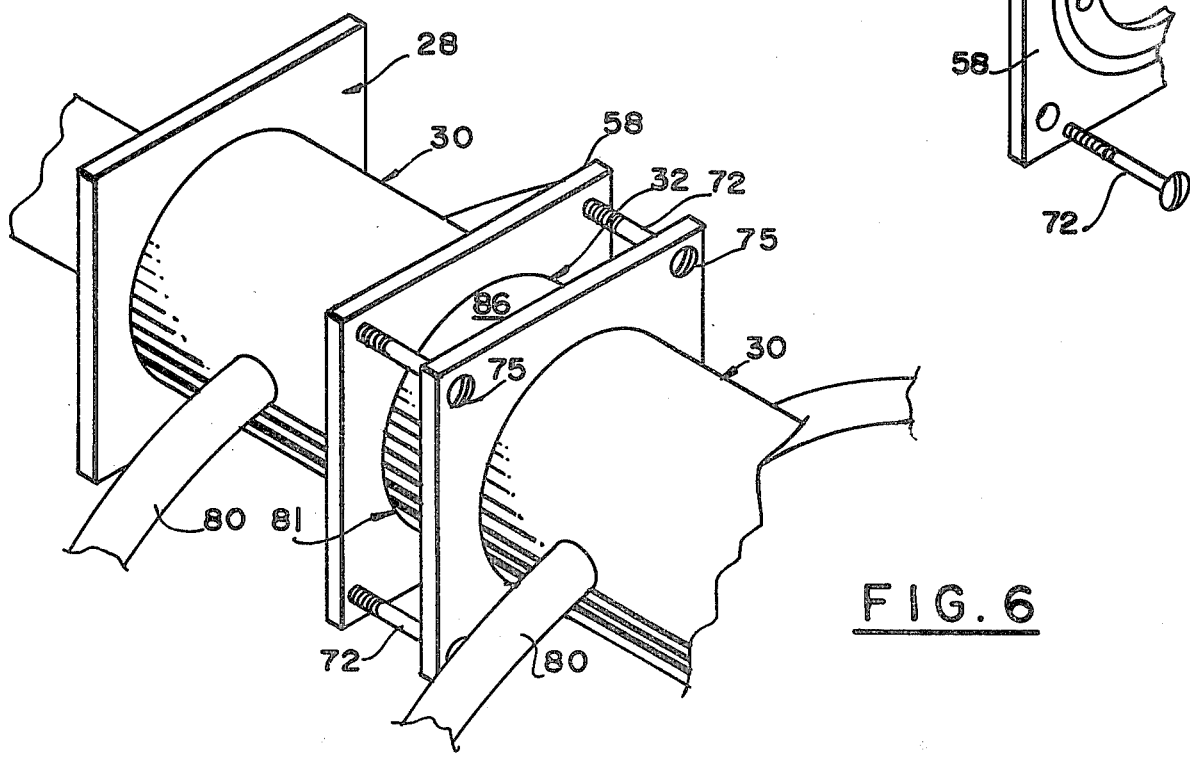
FIG. 6 is a perspective view of a portion of the heat exchanger shown in FIG. 5 in assembled relationship.

Referring to FIGS. 5 and 6 for a more detailed description of the heat exchanger 28, each heat exchanger unit or heater 30 comprises a support plate 58 on each end and the support plate 58 on one end is a common support plate 58 with the vaporizer unit 32 on that end. Each plate 58 comprises a circular cavity 60 having a plurality of bolt holes 62 therein to receive one end of the circular housing 30 of each heat exchanger unit 28 in which is located a circular array of closed heat exchanger conduits or transfer tubes 64 which may be copper tubing that has been soldered or otherwise attached in place on end plates 66 on each end of the housing 30. Each plate 58 includes an opening 64 through which there is communication so that the fuel mixture can travel from the conduit 22 into the respective closed conduits 64 and so on through each series of heat exchanger units 30 and vaporizer units 32 depending upon the particular number of such units selected for a particular vehicle. The units 28 and 32 are connected to each plate by means of screws 70 and the respective plates 58 are connected together by means of bolts 72 thru respective openings 74 in the plates 58. Bolts 72 have nuts 74. The heat exchanger conduits 64 preferably have a total combined open area equal to the maximum capacity of the carburetor 14 plus area for expansion and friction loss. As the fuel air mixture enters the conduits or transfer tubes 64 it absorbs heat and starts to gas.

Each unit 28 comprises an internal chamber which is open around the individual conduit 64 and is in communication with a conduit 78 leading from the exhaust manifold (not shown) of the internal combustion engine so as to bring the heated gas through the conduit 78 which may be a hose or pipe into the interior of the unit 28 circulating about each of the conduits 64 which are constructed from a conductive material such as copper and the like calculated to provide the desired amount of heat exchange and then the heated gases in each unit 28 exit through conduits 80 which may be pipes or hoses connected into the exhaust system of the vehicle in any suitable location such as to a manifold leading to the exhaust system.

The fuel mixture passes from the heat exchanger 28 to the first stage of the cooler assembly 81. Each vaporizer unit 32 comprises a cooling screen or plate 82 constructed of woven fabric material or wire, synthetic or the like, calculated in strand size and opening to provide the desired amount of agitation and turbulance of the fuel mixture after it leaves the individual conduit 64 and prior to entering a three-dimensional filter 84 which is a more solid compacted mass of material, such as a ceramic, foam plastic or foam rubber, having openings and porosity whereby the fuel mixture will pass therethrough in response to the pressure which is exerted from the internal combustion engine. Filters 84 prevent the droplets from joining together. The screen 82 and the filter 84 are held in place by means of a circular housing 86 which is part of the unit 32 and is held in place between respective plates 58. After the fuel mixture has passed through the vaporizer units 32 the temperature drops and, as stated previously, the fuel mixture is directed back through a conduit 54 into the housing 12, through the chamber O and into the fuel intake system of the automobile. A typical screen 82 has 920 holes per square inch, 0.020 in. diameter base. The total open area of the screen 82 is equal to the total open area of the carburetor plus/minus 0. The formula for finding the open area is: Area=Square of Diameter×0.7854.

The carburetor conduits 22, 54 and vaporizer units 32 cause the chemical change along with the proper heating and cooling in the system to allow a change in fuel scheduling. For example in a normal carbureted engine, only a small part of the fuel that is ejected from the carburetor has time to gas and produce power in the cylinders. This invention allows us to inject just that part of fuel which is necessary for power into the cylinders, this system will completely gas and properly mix the fuel and air for a 100% burn with the absence of the after burning from the over abundance of fuel that is present with the carbureted engine, thus reducing fuel consumption, pollution and unnecessary heat.

To better explain this theory use the figure 15 to 1 fuel air ration when speaking of the carburetor engine. For every 15 parts of air that passes through the carburetor's venturi, 1 part of fuel is drawn through the discharge nozzle. It is known that only a small portion of this fuel is gassed by the time it reaches the cylinders and the plug fires. When ignition occurs just the portion of fuel that is a complete gas burns, because liquid gasoline will not burn. This small portion of fuel is the fuel that produces the power for the strokes. However, when ignition and compression occurs there is a heat buildup. The burn rate of that power mixture is approximately 100 ft. per second and produces a pressure at to p dead center of compression of approximately 1000 P.S.I. This is what causes the temperature increase which starts gassing the remaining fuel which burns through the power stroke, through the exhaust stroke and into the exhaust system; but the extra fuel does not cause or help power. The pressure falls from 1000 P.S.I.

to around 60 P.S.I. in approximately 120 degrees of crankshaft rotation. This extra only causes additional heat and pollution.

According to the present invention only the portion of fuel that is needed to produce power is injected into the engine. All this fuel is gassed by the vaporizer unit and is a 100% burnable mixture by the time it reaches the cylinder. When ignition occurs a near 100% burn takes place. There is little after burn, therefore eliminating extra heat and reducing pollution. This rescheduling of fuel is accomplished by changing the size of the main metering jets in the carburetor.

The additional fuel from a carbureted engine also collects between the piston rings and tends to wash the lubricating oil from the cylinder walls. With my invention this fuel does not exist, thus resulting in longer engine life.

On the intake stroke the cylinder fills with a 100% burnable mixture. It is compressed, there is some blow by, however, there is no liquid to wash the oil from the wall; therefore, cylinder wall and ring wear is kept to a minimum. At this point of ignition all the mixture burns. Therefore, no after burns exist, the power stroke has the power, if not more, of a carburetor engine, with the absence of heat from the after burn, as does the exhaust stroke, rather than the exhaust pushing out fire and unburned substance. It expels relatively clean exhaust.

While I have shown and described a particular embodiment of this system for heating a fuel mixture this is not the only form of the invention and is by way of illustration because there are various alterations, changes, deviations, variations, and departures which may be made in the particular preferred form of the invention which has been described but without departing from the scope of the invention as defined only by a proper interpretation of the appended claims.

What is claimed is:

1. In a fuel mixture system for an internal combustion engine having a fuel mixture engine inlet, a carburetor and an exhaust system providing heated gases:
   a housing on said engine inlet for receiving a fuel mixture from said carburetor, said housing being of three-dimensional construction and having a fuel mixture housing compartment inlet leading to a fuel inlet housing compartment therein,
   means on said housing defining said fuel mixture housing compartment inlet separate from a fuel mixture housing compartment outlet within said housing,
   first conduit means in closed communication with said housing compartment inlet and leading to
   a heat exchanger comprising a heat exchanger unit having a closed heat exchanger compartment in closed communication with said first conduit,
   a second conduit leading from the exhaust manifold so as to bring the heated gas from the engine into the heat exchanger unit, and an outlet exchanger conduit means leading from said heat exchanger unit back to the exhaust system of the engine,
   a vaporizer and cooling unit comprising a screen and a filter in communication with said heat exchanger unit whereby the fuel mixture which has been heated in the heat exchanger unit passes through the filter and small openings in the screen of the vaporizer unit and is cooled relative to the raised temperature, and
   cooling unit conduit means leading from said vaporizer and cooling unit to the inlet compartment of the housing and thence to the fuel mixture engine inlet.

2. The device in claim 1 including a second heat exchanger unit in communication with said vaporizer unit whereby the mixture from the vaporizer unit is heated to a gasing point and thence to a second vaporizer unit wherein the fuel mixture is cooled so as to aid in cooling the internal parts of the engine and to provide a good burn mixture in the engine, said cooling unit conduit means leading from the second vaporizer unit to the housing.

3. The device claimed in claim 1 wherein the heat exchanger comprises a plurality of individual fuel mixture conduit units within said fuel mixture compartment and exposed to the circulation of the heated gases from the engine.

4. The device in claim 2 wherein the heat exchanger comprises a plurality of individual fuel mixture conduit units within said fuel mixture compartment and exposed to the circulation of the heated gases from the engine.

5. The device claimed in claim 2 wherein there is a third heat exchanger in communication with said second vaporizer unit and there is a third vaporizer unit in communication with said third heat exchanger unit to receive the fuel mixture therein and to deliver the fuel mixture therefrom through said conduit means back to the housing.

6. The device claimed in claim 1 wherein said screen has approximately 920 holes per square inch and each hole is approximately 0.020 inches in diameter, and the total open area of the screen is equal to the total open area of the carburetor and the area is computed according to the following formula: Area = Square of Diameter $\times 0.7854$.

7. The device claimed in claim 4 wherein said individual fuel mixture conduit units comprise an array of individual, closed tubes in communication with the fuel mixture whereby the fuel mixture passes through said tubes to the vaporizer and cooling unit.

8. The device claimed in claim 1 wherein said filter is a solid mass of material for example foam plastic or foam rubber.

* * * * *